(12) United States Patent
Baek (10) Patent No.: US 9,349,998 B2
(45) Date of Patent: May 24, 2016

(54) BATTERY PACK

(75) Inventor: Woon-Seong Baek, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 529 days.

(21) Appl. No.: 13/046,475

(22) Filed: Mar. 11, 2011

(65) Prior Publication Data

US 2012/0015240 A1 Jan. 19, 2012

(30) Foreign Application Priority Data

Jul. 19, 2010 (KR) .................. 10-2010-0069601

(51) Int. Cl.
  *H01M 2/26* (2006.01)
  *H01M 2/30* (2006.01)
  *H01M 2/02* (2006.01)
  *H01M 10/42* (2006.01)
  *H01M 10/052* (2010.01)

(52) U.S. Cl.
  CPC ............ *H01M 2/021* (2013.01); *H01M 2/0212* (2013.01); *H01M 2/263* (2013.01); *H01M 2/30* (2013.01); *H01M 10/425* (2013.01); *H01M 2/0217* (2013.01); *H01M 10/052* (2013.01); *Y02T 10/7011* (2013.01)

(58) Field of Classification Search
  CPC .......... H01M 2/30; H01M 2/06; H01M 2/24; H01M 2/26; H01M 6/44; H01M 10/425; H01R 11/281; H01R 11/282; H01R 11/285; H01R 11/286; H01R 11/288; H01R 11/24; H01R 11/22
  USPC .................. 429/121, 99–100, 158–161, 163, 429/178–179, 208, 211, 726, 728, 729, 429/759–761, 756, 774, 776, 786, 787, 834, 429/842; 439/726, 728, 729, 759–761, 756, 439/774, 776, 786, 787, 834, 842
  See application file for complete search history.

(56) References Cited

U.S. PATENT DOCUMENTS

| | | | |
|---|---|---|---|
| 6,335,110 B1 * | 1/2002 | Chang et al. ...................... | 429/7 |
| 6,924,059 B1 * | 8/2005 | Kawakami et al. ........... | 429/162 |
| 7,384,705 B2 * | 6/2008 | Kezuka et al. ................. | 429/211 |
| 2009/0081485 A1 * | 3/2009 | Heo ................... | 429/7 |
| 2009/0176155 A1 * | 7/2009 | Choi ............................. | 429/178 |
| 2011/0129718 A1 * | 6/2011 | Lee ............................... | 429/153 |

FOREIGN PATENT DOCUMENTS

| | | | |
|---|---|---|---|
| JP | 2004-71199 | | 3/2004 |
| JP | 2008016202 | * | 1/2008 |

(Continued)

OTHER PUBLICATIONS

KIPO Office Action dated Sep. 28, 2011, for Korean Priority Patent Application No. 10-2010-0069601, 3 pages.

*Primary Examiner* — Ula C Ruddock
*Assistant Examiner* — Thomas Parsons
(74) *Attorney, Agent, or Firm* — Lewis Roca Rothgerber Christie LLP (57) ABSTRACT

A battery pack including a bare cell having an electrode assembly, a case housing the electrode assembly, and a plurality of electrode taps electrically coupled to the electrode assembly, each of the electrode taps having an electrode connection portion; and a plurality of electrode terminals each including a plurality of elastically deformable portions, wherein each of the electrode terminals is electrically coupled to one of the electrode taps, wherein the electrode connection portion of a respective one of the electrode taps is coupled between the elastically deformable portions of a respective one of the electrode terminals.

18 Claims, 6 Drawing Sheets

(56) References Cited

FOREIGN PATENT DOCUMENTS

| KR | 10-2006-102208 A | 9/2006 |
| KR | 10-2009-0031158 A | 3/2009 |
| KR | 10-2009-64069 | 6/2009 |
| WO | WO 2006-101343 A1 | 9/2006 |
| WO | WO 2009-078585 A1 | 6/2009 |

\* cited by examiner

BATTERY PACK

CROSS-REFERENCE TO RELATED APPLICATION

This application claims the benefit of Korean Patent Application No. 10-2010-0069601, filed on Jul. 19, 2010, in the Korean Intellectual Property Office, the disclosure of which is incorporated herein in its entirety by reference.

BACKGROUND

1. Field

One or more embodiments of the present invention relate to a battery pack.

2. Description of Related Art

In general, secondary batteries may be discharged and recharged, unlike a primary battery, which may not be recharged. Secondary batteries are used as energy sources of small-sized devices, such as cellular phones, laptop computers, and camcorders, and medium-large sized devices, such as electric cars, hybrid electric cars, electric bicycles, and as an uninterruptible power supply (UPS).

A lithium secondary battery is an example of a secondary battery. The lithium secondary battery may be classified as a can-type secondary battery, which has a cylindrical or square shape depending on the shape of a case accommodating a battery unit, or a pouch-type secondary battery having flexibility.

A secondary battery may be classified as a liquid electrolyte battery or a polymer electrolyte battery according to the type of electrolyte used therein. In general, a battery using a liquid electrolyte is referred to as a lithium ion battery, and a battery using a polymer electrolyte is referred to as a polymer battery.

Conventionally, a secondary battery allows a bare cell accommodating an electrode assembly to be coupled to a protection circuit module (PCM). An electrode terminal of the PCM is electrically coupled to electrode taps of a conventional bare cell by using, for example, an arc welding method, a laser welding method, or a spot welding method. However, the above conventional welding methods have difficult welding conditions and may cause a safety problem.

Accordingly, these welding methods require a worker to be skilled and educated about safety. However, a welding process may still be risky despite such requirements. Such a potential risk causes difficulty in safely manufacturing and supplying a battery pack.

SUMMARY

One or more embodiments of the present invention include a battery pack that uses an electrical connection method that requires no welding process to connect an electrode terminal of a protection circuit module (PCM) to electrode taps of a bare cell.

According to one or more embodiments of the present invention, a battery pack includes a bare cell having an electrode assembly, a case housing the electrode assembly, and a plurality of electrode taps electrically coupled to the electrode assembly, each of the electrode taps having an electrode connection portion; and a plurality of electrode terminals each including a plurality of elastically deformable portions, wherein each of the electrode terminals is electrically coupled to one of the electrode taps, wherein the electrode connection portion of a respective one of the electrode taps is coupled between the elastically deformable portions of a respective one of the electrode terminals.

In one embodiment, the electrode connection portion is a connection plate that is electrically coupled to the one of the electrode taps, and the elastically deformable portions protrude into an accommodation groove formed between the elastically deformable portions and elastically support the connection plate in the accommodation groove. In other embodiments, the electrode connection portion may also be, for example, a plating layer, a cladding layer, or a region of the electrode tap being thicker than a remainder of the electrode tap. Further, the connection plate may be electrically coupled to a part of one surface or two surfaces of the electrode tap or the entirety of the surface or surfaces of the electrode tap exposed from the case.

In one embodiment, the electrode terminals each comprise a first base plate and a second base plate spaced from the first base plate, wherein an accommodation groove is located between the first base plate and the second base plate, and a bridge portion that connects the first base plate and the second base plate and is electrically coupled to a base circuit substrate, wherein the elastically deformable portions protrude in a direction into the accommodation groove from the first base plate to the second base plate. In one embodiment, the plurality of elastically deformable portions are substantially arc-shaped and protrude into the accommodation groove from the first base plate or the second base plate. Further, one of the elastically deformable portions on the first base plate may contact another one of the elastically deformable portions on the second base plate.

In one embodiment, a clamping portion may be formed on at least one of the first base plate and the second base plate, wherein the clamping portion protrudes into the accommodation groove. Additionally, an outer case may be provided covering at least a portion of the bare cell, wherein the outer case may cover a first end portion of the bare cell and comprises side walls extending substantially perpendicularly to the first end portion, and wherein the electrode taps are exposed outside of the case through the side walls.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE EMBODIMENTS

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Figure 1:
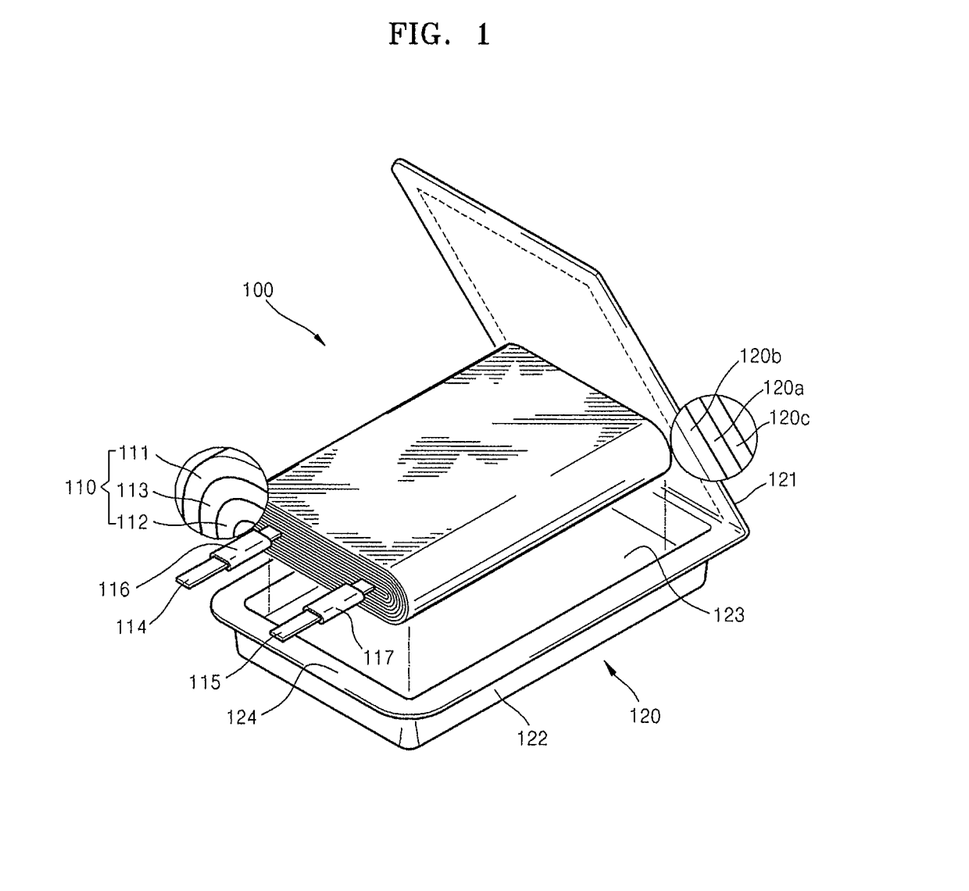
FIG. 1 is an exploded perspective view illustrating a polymer bare cell according to an embodiment of the present invention.

FIG. 1 is an exploded perspective view illustrating a polymer bare cell 100, according to an embodiment of the present invention.

Referring to FIG. 1, the polymer bare cell 100 includes an electrode assembly 110 and a case 120 for accommodating the electrode assembly 110. The electrode assembly 110 includes a positive electrode plate 111, a negative electrode plate 112, and a separator 113 located between the positive electrode plate 111 and the negative electrode plate 112.

A positive electrode tap 114 is electrically coupled to the positive electrode plate 111 and a positive electrode insulating tape 116 is wound on the positive electrode tap 114. A negative electrode tap 115 is electrically coupled to the negative electrode plate 112 and a negative electrode insulating tape 117 is wound on the negative electrode tap 115.

In one embodiment, the case 120 is a flexible pouch type case. The case 120 includes an upper case 121 and a lower case 122 coupled to the upper case 121. At least one surface of the upper case 121 and at least one surface of the lower case 122 are coupled to each other as one body. The case 120 is formed of a layered structure including a metal foil 120a and insulating films 120b and 120c that are attached on opposite sides of the metal foil 120a, but the present invention is not limited thereto.

The electrode assembly 110 is housed in a space portion 123 formed inside the case 120. The positive electrode insulating tape 116 and the negative electrode insulating tape 117 are thermally adhered to a sealing surface 124. Ends of the positive electrode tap 114 and the negative electrode tap 115 are exposed outside of the case 120.

Figure 2:
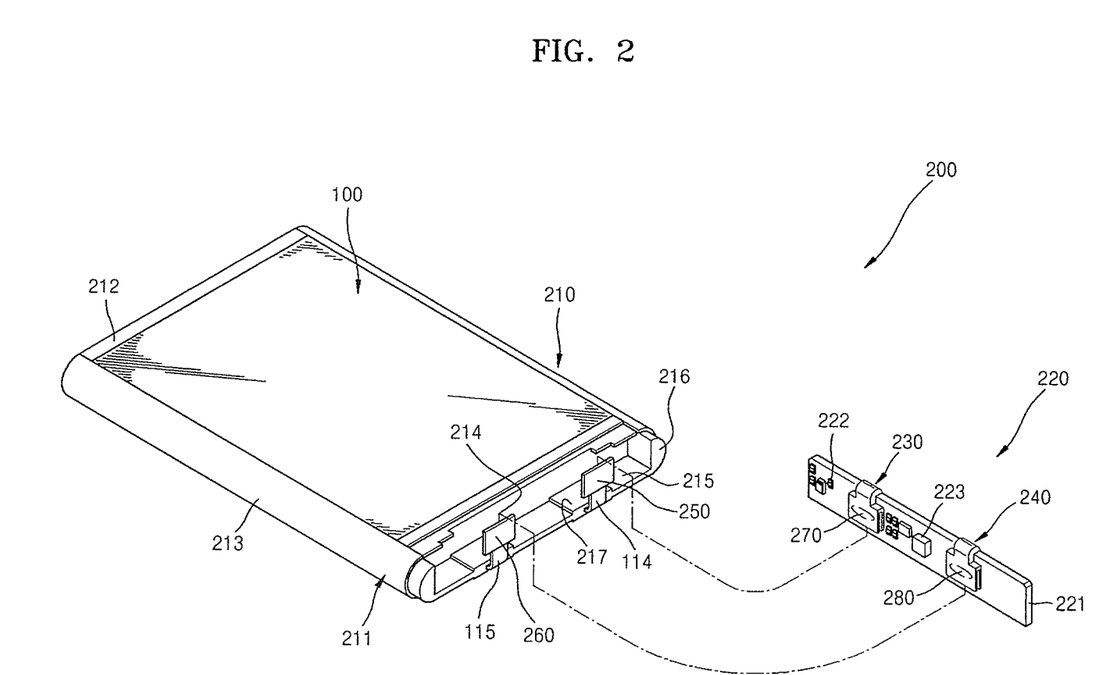
FIG. 2 is an exploded perspective view illustrating a battery pack according to an embodiment of the present invention.

FIG. 2 is an exploded perspective view illustrating a battery pack 200, according to an embodiment of the present invention.

Like reference numerals in the following description denote like elements in the previous description.

Referring to FIG. 2, the battery pack 200 includes the bare cell 100 surrounded/covered by an outer case 210, and a protection circuit module (PCM) 220 that is electrically coupled to the bare cell 100.

The bare cell 100 includes the case 120 accommodating the electrode assembly 110 as described with reference to FIG. 1. The ends of the positive electrode tap 114 and the negative electrode tap 115 are exposed outside of the case 120 and are located at a side of the PCM 220.

The bare cell 100 is partially enclosed by the outer case 210 in order to protect the bare cell 100 and reinforce the rigidity thereof. The outer case 210 includes a first portion 211 covering an upper end portion of the bare cell 100 corresponding to the exposed ends of the positive electrode tap 114 and the negative electrode tap 115, a second portion 212 opposite to the first portion 211 and covering a lower portion of the bare cell 100, and a third portion 213 covering side walls of the bare cell 100. In one embodiment, the first portion 211, the second portion 212, and the third portion 213 are formed as one integral body.

The outer case 210 including the first portion 211, the second portion 212, and the third portion 213 is formed to enclose at least a part of an outer surface of the bare cell 100 and is formed by injection-molding using a polymer resin. Alternatively, the outer case 210 may be formed to entirely cover the bare cell 100, except for the exposed ends of the positive electrode tap 114 and the negative electrode tap 115, but the present invention is not limited to any one structure.

In one embodiment, the outer case 210 covers the upper end portion of the bare cell 100 to couple the outer case 210 and the PCM 220.

The first portion 211 of the outer case 210 includes a bottom portion 214 covering the upper end portion of the bare cell 100, first side walls 215 extending in a direction perpendicularly to the bottom portion 214 from long side edges of the bottom portion 214, and second side walls 216 extending in the direction perpendicularly to the bottom portion 214 from short side edges of the bottom portion 214.

The first side walls 215 extend from the long side edges of the bottom portion 214, but the height and shape thereof are not limited. The second side walls 216 extend from the short side edges of the bottom portion 214, but the height and shape thereof are not limited.

A reinforcement portion 217 is formed in the first side wall 215 that generally correspond to the positive and negative electrode taps 114 and 115 so that movement of the positive electrode tap 114 and the negative electrode tap 115 is reduced while the ends of the positive electrode tap 114 and the negative electrode tap 115, which are electrically coupled to the electrode assembly 110 of the bare cell 100, are exposed.

The PCM 220 is located in the upper end portion of the bare cell 100 at least partially enclosed by the outer case 210.

The PCM 220 includes a circuit board 221, a plurality of electronic elements 222 mounted on the circuit board 221, a positive temperature coefficient (PTC) element 223 functioning as a safety element, a positive electrode terminal 230, and a negative electrode terminal 240.

The circuit board 221 includes a printed circuit board (PCB) in which at least one circuit pattern layer is formed. The electronic elements 222 include an integrated circuit (IC) chip, a field effect transistor (FET), a resistor, a capacitor, etc. The PTC element 223 includes conductive particles and a polymer. The PTC element 223 is electrically coupled to the negative electrode terminal 240.

In this regard, a positive electrode connection portion 250 and a negative electrode connection portion 260 are respectively formed on the positive electrode tap 114 and the negative electrode tap 115 so as to be connected to the positive electrode terminal 230 and the negative electrode terminal 240. With respect to the orientation of the bare cell in FIG. 2, the positive electrode connection portion 250 and the negative electrode connection portion 260 are curved upward, and the positive electrode terminal 230 and the negative electrode terminal 240 are curved downward so that the positive electrode connection portion 250 and the negative electrode connection portion 260 may be respectively coupled to the positive electrode terminal 230 and the negative electrode terminal 240. A positive electrode elastic portion 270 and a negative electrode elastic portion 280 are respectively formed on the positive electrode terminal 230 and the negative electrode terminal 240 so that the positive electrode elastic portion 270 and the negative electrode elastic portion 280 may be elastically coupled to the positive electrode connection portion 250 and the negative electrode connection portion 260, as described in more detail below.

Figure 3:
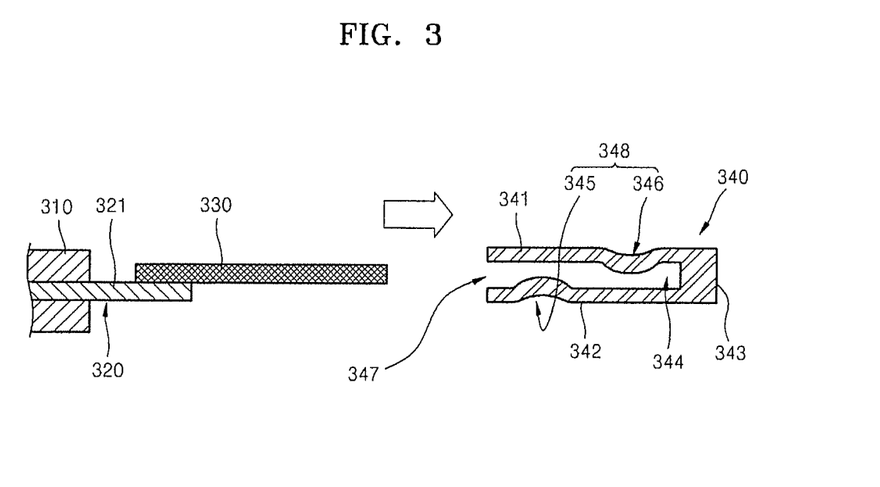
FIG. 3 is a partial cross-sectional view of an electrode tap on which an electrode connection portion is formed and an electrode terminal in an uncoupled state according to an embodiment of the present invention.

FIG. 3 is a partial cross-sectional view of an electrode tap 320 on which an electrode connection portion 330 is formed and an electrode terminal 340 in an uncoupled state, according to an embodiment of the present invention.

In this regard, the electrode tap 320 is a positive electrode tap or a negative electrode tap mentioned above, and the electrode terminal 340 is a positive electrode terminal or a negative electrode terminal mounted on a circuit board, or a terminal electrically coupled to the positive electrode terminal or the negative electrode terminal.

Referring to FIG. 3, an end of the electrode tap 320 is exposed outside of an outer case 310 housing a bare cell. In one embodiment, the electrode tap 320 is a metal plate formed of a material having an excellent electrical conductivity, for example, nickel, aluminum, copper, or an alloy thereof.

The electrode tap 320 may be easily deformed because the electrode tap 320 is a thin film, and thus the electrode tap 320 may be easily bent when coupled to the electrode terminal 340. To prevent the electrode tap 320 from being deformed, the electrode connection portion 330 is formed on the electrode tap 320 to reinforce the thickness of the electrode tap 320. The electrode connection portion 330 is electrically coupled to a first surface 321 of the end of the electrode tap 320. The electrode connection portion 330 is a connection plate formed of a material having an excellent electrical conductivity. The thickness of the electrode connection portion 330 may be greater than the thickness of the electrode tap 320.

The electrode tap 320 on which the electrode connection portion 330 is formed is inserted into the electrode terminal 340 so that the electrode terminal 340 is elastically coupled to the electrode tap 320. The electrode terminal 340 includes a first base plate 341, a second base plate 342 spaced from the first base plate 341, and a bridge portion 343 that connects an end of the first base plate 341 and an end of the second base plate 342.

An accommodation groove 344 into which the electrode connection portion 330 is inserted is formed between the first base plate 341 and the second base plate 342. A plurality of elastic portions 348 are formed in the accommodation groove 344 to elastically support the electrode connection portion 330 when the electrode connection portion 330 is inserted into the accommodation groove 344.

The elastic portions 348 are each elastically deformable (i.e., they can be bent, but are biased toward a certain shape as shown in, for example, FIG. 3) and include a first elastic portion 345 and a second elastic portion 346. The first elastic portion 345 is in an embossed arc-shape protruding into the accommodation groove 344 from the second base plate 342 to the first base plate 341. The second elastic portion 346 is in an embossed arc-shape protruding into the accommodation groove 344 from the first base plate 341 to the second base plate 342. As will be appreciated, the specific shape of the elastic portions 348 are not limited thereto and may be any suitable shape.

An outer surface of the first base plate 341 in which the second elastic portion 346 is formed and an outer surface of the second base plate 342 in which the first elastic portion 345 is formed, respectively, form curve portions generally corresponding to the thicknesses of the first elastic portion 345 and the second elastic portion 346 which protrude into the accommodation groove 344.

In this regard, the first elastic portion 345 and the second elastic portion 346 do not contact each other in a vertical direction and are arranged to not be aligned with each other (i.e., they do not directly face each other). The first elastic portion 345 is adjacent to an entrance 347 in which the accommodation groove 344 of the electrode terminal 340 is formed, and the second elastic portion 346 is located between the first elastic portion 345 and the bridge portion 343.

Figure 4:
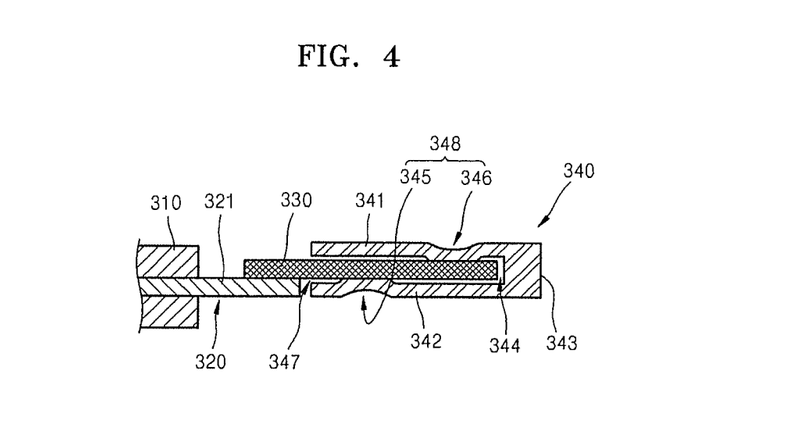
FIG. 4 is a partial cross-sectional view of the electrode tap of FIG. 3 in a coupled state according to an embodiment of the present invention.

FIG. 4 is a partial cross-sectional view of the electrode tap 320 on which the electrode connection portion 330 is formed and the electrode terminal 340 in a coupled state, according to an embodiment of the present invention.

Referring to FIG. 4, the electrode connection portion 330, which is electrically coupled to the first surface 321 of the electrode tap 320 and minimizes the likelihood of the electrode tap 320 being deformed, enters into the entrance 347 of the accommodation groove 344 of the electrode terminal 340.

The electrode connection portion 330 is inserted past the first elastic portion 345 and the second elastic portion 346 alternately arranged in the accommodation groove 344. In this regard, the first elastic portion 345 and the second elastic portion 346 elastically pressurize opposite surfaces of the electrode connection portion 330. Accordingly, the electrode connection portion 330 is fixed in the accommodation groove 344 of the electrode terminal 340 by an interference fit.

As described above, the electrode tap 320 is elastically supported by the first elastic portion 345 and the second elastic portion 346 when the electrode connection portion 330 formed on the end of the electrode tap 320 is inserted into the accommodation groove 344 and is coupled to the electrode terminal 340, and thus the electrode tap 320 on which the electrode connection portion 330 is formed is not likely to be detached from the electrode terminal 340, and the electrode tap 320 and the electrode terminal 340 are electrically coupled to each other.

Figure 5:
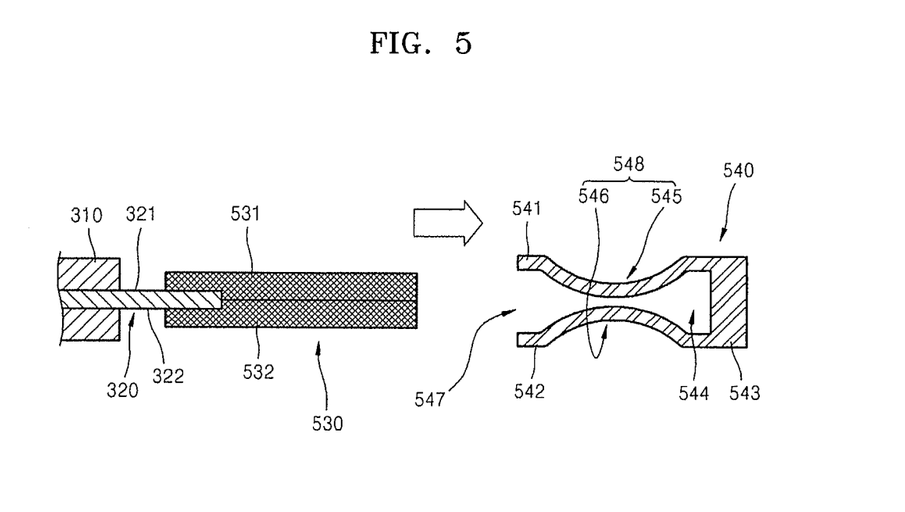
FIG. 5 is a partial cross-sectional view of an electrode tap on which an electrode connection portion is formed and an electrode terminal in an uncoupled state according to another embodiment of the present invention.

FIG. 5 is a partial cross-sectional view of the electrode tap 320 on which an electrode connection portion 530 is formed and an electrode terminal 540 in an uncoupled state, according to another embodiment of the present invention.

Referring to FIG. 5, the end of the electrode tap 320 is exposed outside of the outer case 310 housing a bare cell. The electrode connection portion 530 is formed on the end of the electrode tap 320 to reinforce the thickness of the electrode tap 320.

The electrode connection portion 530 includes a first electrode connection portion 531 formed on the first surface 321 of the end of the electrode tap 320 and a second electrode connection portion 532 formed on a second surface 322 of the end of the electrode tap 320. The first electrode connection portion 531 and the second electrode connection portion 532 are connection plates formed of a material having an excellent electrical conductivity and are coupled to each other over both sides of the end of the electrode tap 320 located therebetween by using a coupling method, such as pressure welding.

The electrode tap 320 on which the electrode connection portion 530 is formed is inserted into the electrode terminal 540 so that the electrode terminal 540 is elastically coupled to the electrode tap 320. The electrode terminal 540 includes a first base plate 541, a second base plate 542 spaced from the first base plate 541, and a bridge portion 543 that connects an end of the first base plate 541 and an end of the second base plate 542.

An accommodation groove 544 into which the electrode connection portion 530 is inserted is formed between the first base plate 541 and the second base plate 542. A plurality of elastic portions 548 are formed to protrude into the accommodation groove 544 to elastically support the electrode connection portion 530 when the electrode connection portion 530 is inserted into the accommodation groove 544.

The elastic portions 548 include a first elastic portion 545 and a second elastic portion 546. The first elastic portion 545 is in an embossed arc-shape protruding into the accommodation groove 544 from the first base plate 541 to the second base plate 542. The second elastic portion 546 is in an embossed arc-shape protruding into the accommodation groove 544 from the second base plate 542 to the first base plate 541.

An outer surface of the first base plate 541 in which the second elastic portion 546 is formed and an outer surface of the second base plate 542 in which the first elastic portion 545 is formed, respectively, form curve portions generally corresponding to the thicknesses of the first elastic portion 545 and the second elastic portion 546 which protrude toward the accommodation groove 544.

The first elastic portion 545 and the second elastic portion 546 may contact each other in a vertical direction or be oriented so that the space between them at least at a certain portion is very small. Therefore, when the electrode connection portion 530 formed on the end of the electrode tap 320 is inserted into an entrance 547 of the accommodation groove 544 formed in the electrode terminal 540 and is coupled to the electrode terminal 540, an outer surface of the first electrode connection portion 531 is supported by the first elastic portion 545, and an outer surface of the second electrode connection portion 532 is supported by the second elastic portion 546.

In one embodiment, the first electrode connection portion 531 and the second electrode connection portion 532 may be metal plates formed of a material having an excellent electrical conductivity, for example, nickel, aluminum, copper, steel, or an alloy thereof. However, the present invention is not limited thereto, and the first electrode connection portion 531 and the second electrode connection portion 532 may be formed of a second cladding material, or the first electrode connection portion 531 may be a metal plate and the second electrode connection portion 532 may be formed of a cladding material.

Figure 6:
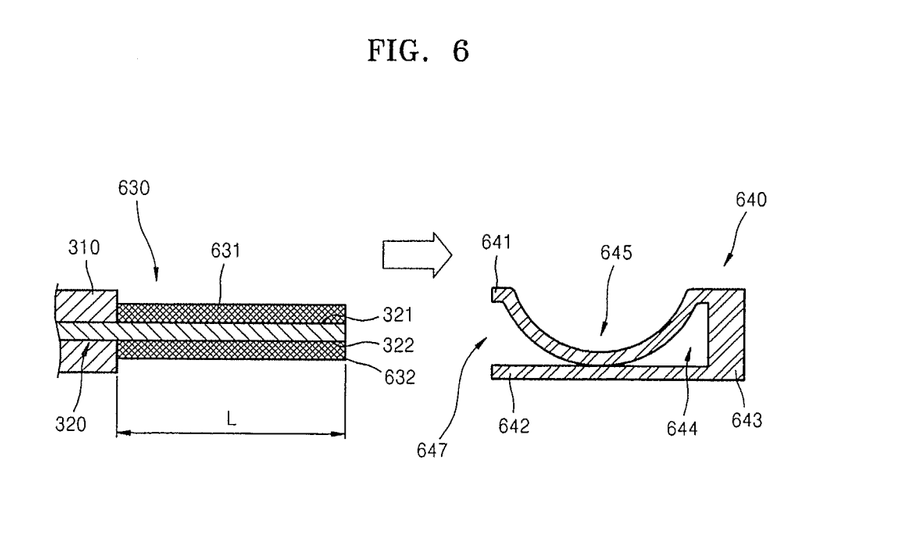
FIG. 6 is a partial cross-sectional view of an electrode tap on which an electrode connection portion is formed and an electrode terminal in an uncoupled state according to yet another embodiment of the present invention.

FIG. 6 is a partial cross-sectional view of the electrode tap 320 on which an electrode connection portion 630 is formed and an electrode terminal 640 in an uncoupled state, according to another embodiment of the present invention.

Referring to FIG. 6, the end of the electrode tap 320 is exposed outside of the outer case 310 enclosing a bare cell. The electrode tap portion 630 is formed on an outer surface of the electrode tap 320 and includes a first electrode connection portion 631 electrically coupled to the first surface 321 of the end of the electrode tap 320 and a second electrode connection portion 632 electrically coupled to the second surface 322 of the end of the electrode tap 320.

The first electrode connection portion 631 and the second electrode connection portion 632 are coupled to each other with the electrode tap 320 located therebetween by using, for example, pressure welding, to reinforce the thickness of the electrode tap 320. In this regard, the electrode connection portion 630 covers an entire region L of the electrode tap 320 exposed outside of the outer case 310.

The electrode tap 320 on which the electrode connection portion 630 is formed is inserted into the electrode terminal 640 so that the electrode terminal 640 is elastically coupled to the electrode tap 320. The electrode terminal 640 includes a first base plate 641, a second base plate 642 spaced from the first base plate 641, and a bridge portion 643 that connects an end of the first base plate 641 and an end of the second base plate 642.

An accommodation groove 644 into which the electrode tap 320 on which the electrode connection portion 630 is formed is located in a space between the first base plate 641 and the second base plate 642. An elastic portion 645 is formed to protrude into the accommodation groove 644 to elastically support the electrode tap 320 on which the electrode connection portion 630 is formed when the electrode tap 320 is inserted into the accommodation groove 644.

The elastic portion 645 is in an embossed arc-shape protruding into the accommodation groove 644 from the first base plate 641 to the second base plate 642. An outer surface of the first base plate 641 in which the elastic portion 645 is formed forms curve portions generally corresponding to the thickness of the elastic portion 645, which protrudes toward the accommodation groove 644. The first elastic portion 645 contacts an inner surface of the second base plate 642. Therefore, when the electrode tap 320 on which the electrode connection portion 630 is inserted into an entrance 647 of the accommodation groove 644 formed in the electrode terminal 640 and is coupled to the electrode terminal 640, the electrode tap 320 on which the electrode connection portion 630 is formed is elastically supported by the first elastic portion 645.

Figure 7:
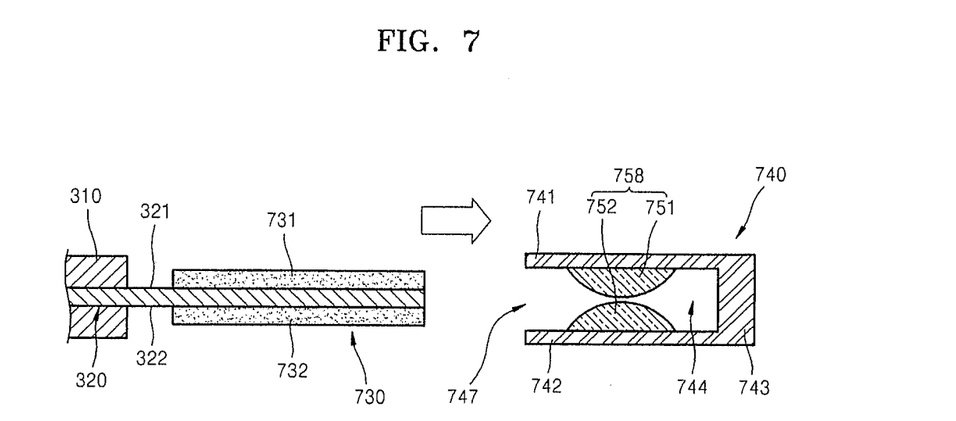
FIG. 7 is a partial cross-sectional view of an electrode tap on which an electrode connection portion is formed and an electrode terminal in an uncoupled state according to still another embodiment of the present invention.

FIG. 7 is a partial cross-sectional view of the electrode tap 320 on which an electrode connection portion 730 is formed and an electrode terminal 740 in an uncoupled state, according to another embodiment of the present invention.

Referring to FIG. 7, the end of the electrode tap 320 is exposed outside of the outer case 310 housing a bare cell. The electrode tap portion 730 is formed on the end of the electrode tap 320 and includes a first plating layer 731 formed on the first surface 321 of the end of the electrode tap 320 and a second plating layer 732 formed on the second surface 322 of the end of the electrode tap 320. However, the present invention is not limited thereto as long as the first plating layer 731 and the second plating layer 732 are formed on at least one of the surfaces of the electrode tap 320. Further, the electrode connection portion 730 may not be formed only on the end of the electrode tap 320, but rather may be formed on an entire region of the electrode tap 320 exposed outside of the outer case 310.

The electrode tap 320 on which the electrode connection portion 730 is plated is inserted into the electrode terminal 740 so that the electrode terminal 740 is elastically coupled to the electrode tap 320. The electrode terminal 740 includes a first base plate 741, a second base plate 742 spaced from the first base plate 741, and a bridge portion 743 that connects an end of the first base plate 741 and an end of the second base plate 742.

An accommodation groove 744 into which the electrode tap 320 plated with the electrode connection portion 730 is inserted is formed in a space between the first base plate 741 and the second base plate 742. A plurality of elastic portions 758 are formed in the accommodation groove 744 to elastically support the electrode connection portion 730 when the electrode connection portion 730 is inserted into the accommodation groove 744.

The elastic portions 758 include a first elastic portion 751 and a second elastic portion 752. The first elastic portion 751 is in an arc-shape protruding into the accommodation groove 744 from the first base plate 741 to the second base plate 742. The second elastic portion 752 is in an arc-shape protruding toward the accommodation groove 744 from the second base plate 742 to the first base plate 741.

However, the present invention is not limited thereto. The first elastic portion 751 may integrally protrude from an inner surface of the first base plate 741 or may be adhered to an additional elastic member, and the second elastic portion 752 may integrally protrude from an inner surface of the second base plate 742 or may be adhered to an additional elastic member.

The first elastic portion 751 and the second elastic portion 752 contact each other in a vertical direction. Therefore, when the electrode tap 320 plated with the electrode connection portion 730 is inserted into an entrance 747 of the accommodation groove 744 formed in the electrode terminal 740 and is coupled to the electrode terminal 740, the electrode tap 320 plated with the electrode connection portion 730 is coupled to the electrode terminal 740 between the first elastic portion 751 and the second elastic portion 752 and is elastically supported by the first elastic portion 751 and the second elastic portion 752 at the same time.

Figure 8:
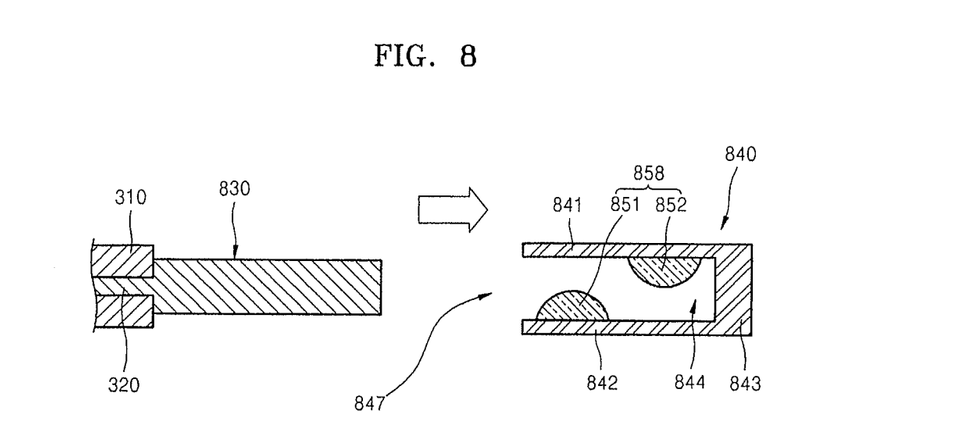
FIG. 8 is a partial cross-sectional view of an electrode tap on which an electrode connection portion is formed and an electrode terminal in an uncoupled state, according to yet another embodiment of the present invention.

FIG. 8 is a partial cross-sectional view of the electrode tap 320 on which an electrode connection portion 830 is formed and an electrode terminal 840 in an uncoupled state, according to another embodiment of the present invention.

Referring to FIG. 8, the end of the electrode tap 320 is exposed outside of the outer case 310 housing a bare cell. The electrode connection portion 830 is formed on an end of the electrode tap 320. In this regard, the electrode connection portion 830 is a thickness reinforcing portion that allows the exposed portion of the electrode tap 320 to be thicker than other portions thereof.

The electrode tap 320 on which the electrode connection portion 830 is formed is inserted into the electrode terminal 840 so that the electrode terminal 840 is elastically coupled to the electrode tap 320. The electrode terminal 840 includes a first base plate 841, a second base plate 842 spaced from the first base plate 841, and a bridge portion 843 that connects an end of the first base plate 841 and an end of the second base plate 842.

An accommodation groove 844 into which the electrode connection portion 830 is inserted is formed between the first base plate 841 and the second base plate 842. A plurality of elastic portions 858 are formed in the accommodation groove 844 to elastically support the electrode connection portion 830 when the electrode connection portion 830 is inserted into the accommodation groove 844.

The elastic portions 858 include a first elastic portion 851 and a second elastic portion 852. The first elastic portion 851 is in an arc-shape protruding into the accommodation groove 844 from the second base plate 842 to the first base plate 841. The second elastic portion 852 is in an arc-shape protruding toward the accommodation groove 844 from the first base plate 841 to the second base plate 842.

In one embodiment, the first elastic portion 851 and the second elastic portion 852 do not contact each other in a vertical direction and are alternately arranged so that they do not directly overlap or are not directly across from each other. The first elastic portion 851 is generally adjacent to an entrance 847 formed in the accommodation groove 844 of the electrode terminal 840 and the second elastic portion 852 is located between the first elastic portion 851 and the bridge portion 843.

Therefore, when the electrode connection portion 830 is inserted into the entrance 847 of the accommodation groove 844 formed in the electrode terminal 840 and is coupled to the electrode terminal 840, the electrode connection portion 830 is coupled to the electrode terminal 840 between the first elastic portion 851 and the second elastic portion 852 and is elastically supported by the first elastic portion 851 and the second elastic portion 852 at the same time.

Figure 9:
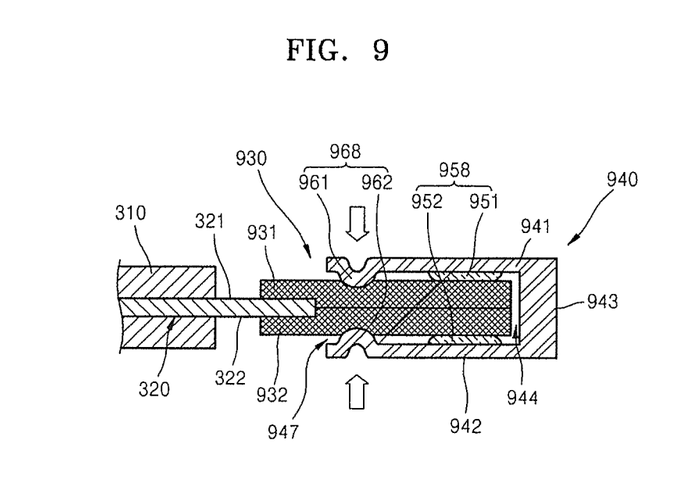
FIG. 9 is a partial cross-sectional view of an electrode tap on which an electrode connection portion is formed and an electrode terminal in a coupled state, according to still another embodiment of the present invention.

FIG. 9 is a partial cross-sectional view of the electrode tap 320 on which an electrode tap portion 930 is formed and an electrode terminal 940 in a coupled state, according to another embodiment of the present invention.

Referring to FIG. 9, the end of the electrode tap 320 is exposed outside of the outer case 310 surrounding/covering a bare cell. The electrode connection portion 930 is formed on an end of the electrode tap 320 and includes a first electrode connection portion 931 formed on the first surface 321 of the end of the electrode tap 320 and a second electrode connection portion 932 formed on the second surface 322 of the end of the electrode tap 320. The first electrode connection portion 931 and the second electrode connection portion 932 are connection plates formed of a material having an excellent electrical conductivity and are coupled to each other over both sides of the end of the electrode tap 320 located therebetween by using a coupling method, such as pressure welding.

The electrode connection portion 930 is inserted into the electrode terminal 940 so that the electrode terminal 940 is elastically coupled to the electrode tap 320. The electrode terminal 940 includes a first base plate 941, a second base plate 942 spaced from the first base plate 941, and a bridge portion 943 that connects an end of the first base plate 941 and an end of the second base plate 942.

An accommodation groove 944 into which the electrode connection portion 930 is inserted is formed between the first base plate 941 and the second base plate 942. A plurality of elastic portions 958 are formed in the accommodation groove 944 to elastically support the electrode connection portion 930 when the electrode connection portion 930 is inserted into the accommodation groove 944.

The elastic portions 958 include a first elastic portion 951 and a second elastic portion 952. The first elastic portion 951 is in an arc shape protruding toward the accommodation groove 944 from the first base plate 941 to the second base plate 942. The second elastic portion 952 is in an arc-shape protruding toward the accommodation groove 944 from the second base plate 942 to the first base plate 941.

However, the present invention is not limited thereto. The first elastic portion 951 may integrally protrude from an inner surface of the first base plate 941 or may be adhered to an additional elastic member, and the second elastic portion 952 may integrally protrude from an inner surface of the second base plate 942 or may be adhered to an additional elastic member.

The first elastic portion 951 and the second elastic portion 952 contact each other in a vertical direction. Therefore, when the electrode connection portion 930 is inserted into an entrance 947 of the accommodation groove 944 formed in the electrode terminal 940 and is coupled to the electrode terminal 940, the electrode connection portion 930 is coupled to the electrode terminal 940 between the first elastic portion 951 and the second elastic portion 952 and is elastically supported by the first elastic portion 951 and the second elastic portion 952 at the same time.

Additionally, a clamping portion 968 is further formed in a region corresponding to where the electrode connection portion 930 is coupled to the entrance 947 of the accommodation groove 944 formed in the electrode terminal 940 so as to strengthen/increase the coupling between the electrode connection portion 930 and the electrode terminal 940.

The clamping portion 968 includes a first clamping unit 961 and a second clamping unit 962. The first clamping unit 961 is clamped from an outer surface of the first base plate 941 adjacent to the accommodation groove 944. The second clamping unit 962 is clamped from an outer surface of the second base plate 942 adjacent to the accommodation groove 944. Thus, the electrode connection portion 930 and the electrode terminal 940 are electrically coupled to each other more firmly.

As described above, according to the one or more of the above embodiments of the present invention, the battery pack does not require a welding process when electrically coupling an electrode terminal of a PCM and an electrode tap of a bare cell, thereby simplifying a manufacturing process and accordingly increasing reliability of the battery pack.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack comprising:
   a bare cell comprising an electrode assembly, a case housing the electrode assembly, a plurality of electrode taps electrically coupled to the electrode assembly, and an electrode connection portion coupled to an end portion of a respective electrode tap, wherein the electrode taps define one positive tap and one negative tap; and
   a plurality of electrode terminals each comprising a plurality of elastically deformable portions, wherein each of the electrode terminals is electrically coupled to one of the electrode taps and mounted on a circuit board on which a plurality of electrode elements are mounted, wherein only the electrode connection portion of a respective one of the electrode taps is encompassed by and coupled by an interference fit without welding between the elastically deformable portions of a respective one of the electrode terminals,
   wherein the electrode terminals each comprise a first base plate and a second base plate spaced from the first base plate, wherein an accommodation groove is located between the first base plate and the second base plate, and a bridge portion that electrically connects the first base plate and the second base plate,
   wherein the elastically deformable portions protrude between the first base plate and the second base plate.

2. The battery pack of claim 1, wherein the electrode connection portion is a connection plate that is electrically coupled to the one of the electrode taps, and
   wherein the elastically deformable portions protrude into an accommodation groove formed between the elastically deformable portions and elastically support the connection plate in the accommodation groove.

3. The battery pack of claim 2, wherein the connection plate is electrically coupled to one surface or two surfaces of the electrode tap.

4. The battery pack of claim 2, wherein the connection plate is electrically coupled to one entire surface or two entire surfaces of the electrode taps exposed outside of the case.

5. The battery pack of claim 1, wherein the electrode connection portion is a plating layer formed on the electrode tap, and
   wherein the elastically deformable portions protrude into an accommodation groove formed between the elastically deformable portions and elastically support the electrode tap in the accommodation groove.

6. The battery pack of claim 5, wherein the plating layer is electrically coupled to one surface or two surfaces of the electrode tap.

7. The battery pack of claim 5, wherein the plating layer is electrically coupled to one entire surface or two entire surfaces of the electrode tap exposed outside of the case.

8. The battery pack of claim 1, wherein the electrode connection portion is a cladding layer formed on the electrode tap,
   wherein the elastically deformable portions protrude into an accommodation groove formed between the elastically deformable portions and elastically support the electrode tap in the accommodation groove.

9. The battery pack of claim 8, wherein the cladding layer comprises at least one of aluminum, nickel, steel, or copper.

10. The battery pack of claim 1, wherein the electrode connection portion has a thickness that is greater than the electrode taps, and
    wherein the elastically deformable portions protrude into an accommodation groove located between the elastically deformable portions and elastically support the electrode tap in the accommodation groove.

11. The battery pack of claim 1, wherein the plurality of elastically deformable portions are substantially arc-shaped and protrude into the accommodation groove from the first base plate or the second base plate.

12. The battery pack of claim 1, wherein the plurality of elastically deformable portions protrude into the accommodation groove from a surface facing the first base plate or the second base plate.

13. The battery pack of claim 1, wherein the plurality of elastically deformable portions are spaced from each other along a length direction of the first base plate and the second base plate.

14. The battery pack of claim 1, wherein one of the elastically deformable portions on the first base plate is configured to contact another one of the elastically deformable portions on the second base plate.

15. The battery pack of claim 1, wherein the accommodation groove has an entrance through which the electrode connection portion is inserted.

16. The battery pack of claim 1, further comprising: a clamping portion formed on at least one of the first base plate and the second base plate, wherein the clamping portion protrudes into the accommodation groove.

17. The battery pack of claim 1, further comprising: an outer case covering at least a portion of the bare cell.

18. The battery pack of claim 17, wherein the outer case covers a first end portion of the bare cell and comprises side walls extending substantially perpendicularly to the first end portion, and wherein the electrode taps are exposed outside of the case through the side walls.

* * * * *